Jan. 17, 1928.  
G. T. COX  
1,656,171  
PLANT SPRAYING APPARATUS  
Filed Oct. 29, 1925  
2 Sheets-Sheet 1
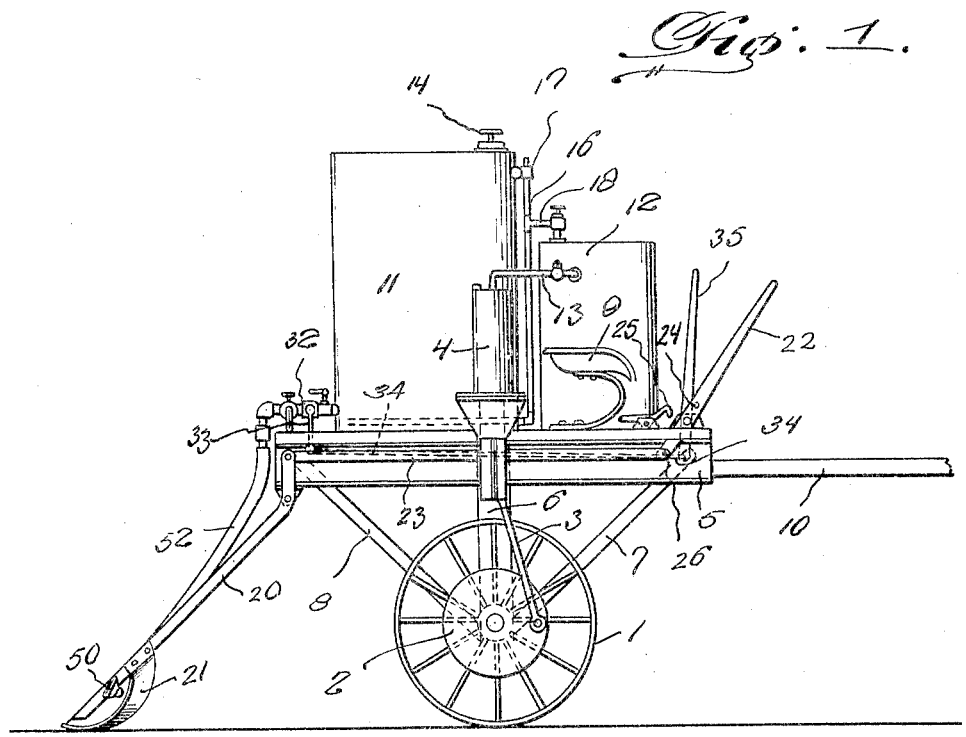
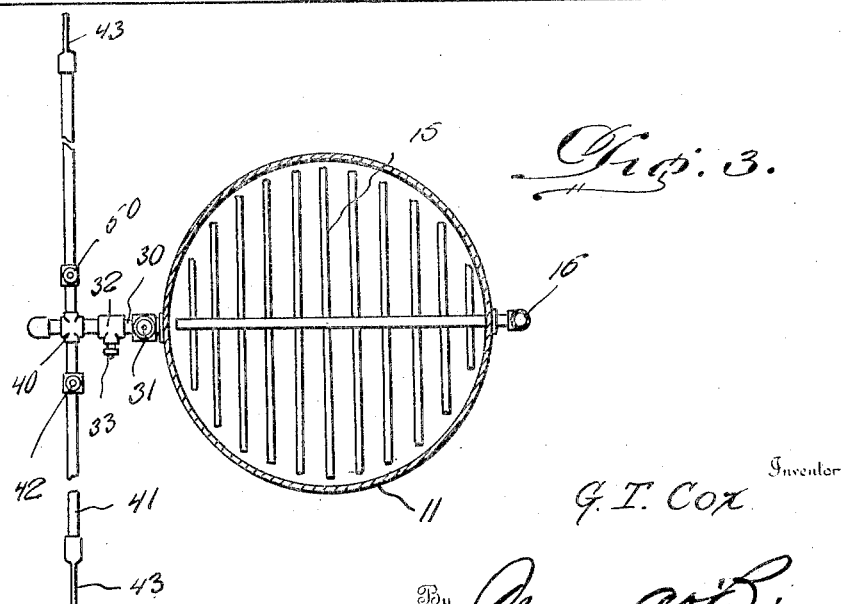
G. T. Cox, Inventor
By Clarence A. O'Brien, Attorney

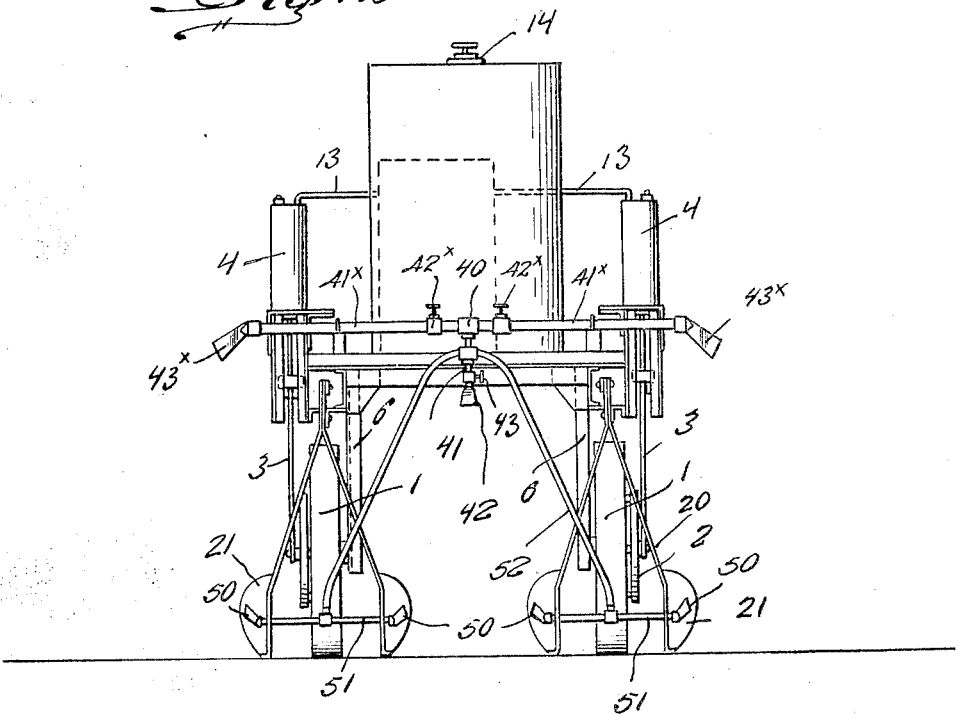
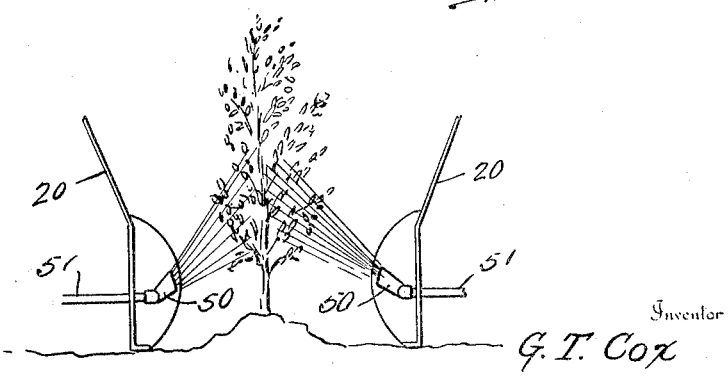

Patented Jan. 17, 1928.

1,656,171

UNITED STATES PATENT OFFICE.

GEORGE THOMAS COX, OF WACO, TEXAS.

PLANT-SPRAYING APPARATUS.

Application filed October 29, 1925. Serial No. 65,600.

My present invention pertains to the spraying of plants for the destruction of insects thereon, and it has for its general object to provide a highly advantageous apparatus for effectively spraying all portions of plants and this notwithstanding the apparatus is not unduly expensive.

Other objects and practical advantages of the invention will be fully understood from the following description and claim when the same are read in connection with the drawings, accompanying and forming part of this specification, in which:—

Figure 1 is a side elevation of the apparatus constituting the best practical embodiment of my invention of which I am cognizant.

Figure 2 is a rear end elevation of the same.

Figure 3 is a detail horizontal section showing the means for injecting air under pressure into the liquid tank with a view to agitating the contents of the tank.

Figure 4 is a detail view, diagrammatic in character, and illustrating the under spray capacity of my improvement.

Similar numerals of reference designate corresponding parts in all of the views of the drawings.

Among other elements my novel apparatus comprises ground wheels 1, and at the outer sides of said ground wheels 1 and fixed with respect thereto are crank disks 2, connected through rods 3 with the pistons of air compressors 4 which compressors per se may be of the construction illustrated or of any other construction compatible with the purpose of my invention.

The air compressors 4 are carried by an appropriate main frame 5 which is supported on the axle of the ground wheels 1, being connected with the said axle by uprights 6, and front and rear braces 7 and 8. On the main frame 5 is a driver's seat 9, and connected to said frame 5 is a tongue or pole 10 for use in the connection of draft animals or one draft animal to the apparatus.

Mounted in superposed relation on the main frame 5 are a tank 11 to receive liquid to be sprayed, and a tank 12 for the holding of air under pressure, the compressors 4 being connected with the tank 12 by appropriately valved conduits 13, Figures 1 and 2.

The tank 11 is provided with normally closed means 14 for the convenient filling thereof, and air under pressure is adapted to be jetted into the lower portion of the tank 11 from an apertured head 15, disposed in the lower portion of the tank 11 and preferably shaped as illustrated, so that during operation of the apparatus air will be injected into the tank 11 at many points adjacent to the walls of the tank and remote from said walls so as to maintain the liquid at all times in a thorough state of agitation. The device 15 is connected to a pipe 16, Figures 1 and 3, and the said pipe 16 is provided with a blower valve 17, and is also provided with a valved arm 18 in direct connection with the interior of the tank 12.

Pivotally connected to the rear portion of the main frame 5 adjacent to the sides thereof are trailing beams 20 on each of which are carried two shoes and fenders 21, said shoes and fenders being preferably spaced apart, and being arranged relative to the ground wheels 1 as illustrated.

For the raising and support of the beams 20 and 21 in idle position as when it is desired to move the apparatus from one point of use to another, I provide the hand lever 22 on the forward portion of the main frame 5, the said lever 22 being connected with the upper arms of the beams by longitudinal links 23, and being designed to cooperate at 24 with a dog 25 on the main frame and having for its purpose to detachably hold the lever 22 in such position that the shoes and fenders 21 will be maintained above and in spaced relation to ground so as not to be worn or damaged when the apparatus is moved from one point of use to another.

It will be manifest from the foregoing that the forward portions of the links 23 are connected to a cross rod 26 and that the lower arm of the lever 22 is in connection with said cross rod.

Leading from the back of the lower portion of the tank 11 is a pipe 30, having at 31 a hand valve and also having outwardly beyond the valve 31 a supplemental valve 32 the plug of which is appropriately connected to a pendent crank 33. Connected to and extending forwardly from the crank 33 is a link 34 in connection at its forward end to the lower arm of a hand lever 35, located at the front of the main frame 5.

Manifestly by manipulating the lever 22 the driver of the apparatus is enabled to quickly and easily raise the beams 20 and shoes and fenders 21 whenever occasion demands, and it will also be noted that by manipulation of the lever 35 the driver is enabled to control the supply of liquid to the spraying devices which will now be described in detail.

A cross coupling 40 is provided at the rear end of the pipe 30, and extending downwardly from the said cross coupling 40 is a pipe 41. A spray device 42 for spraying the tops of plants is carried at the lower end of the said pipe 41 and by preference said spray device 42 is associated with a hand valve 43 whereby when desired the spray device 42 may be conveniently put out of commission. Also connected to the coupling 40 and extending laterally outward in opposite directions therefrom are pipes 41ˣ, valved at 42ˣ, and provided at their outer ends with spray devices 43ˣ. These spray devices 43ˣ are positioned for the adequate spraying of the upper side portions of plants as the apparatus is moved between rows of such plants.

Arranged in or adjacent to each shoe and fender 21 is a spray device 50, and it will be noted that the devices 50 in each pair are connected by a pipe 51 which, in turn, is connected by an appropriate conduit 52 with the rear portion of the pipe 30.

It will be apparent from the foregoing that by manipulation of the hand lever 35 the operator of the apparatus is enabled to establish the supply of liquid to all of the spray devices and to cut off the said supply whenever the same is deemed necessary by the driver of the apparatus. It will also be apparent that by manipulation of the other valves referred to different spray devices may be placed out of commission.

As will be appreciated from Figures 2 and 4 of the drawings, the spray devices 50 are adapted to adequately spray plants, shrubs and trees from below and at the sides thereof, and consequently it will be seen that all insects at the undersides of leaves or branches will be reached and destroyed.

The spray devices 50 and the shoes and fenders of which there is one to each spray device 50 are important features of my invention, the shoes and fenders serving as carriers and also to prevent the spraying devices 50 from catching into plants or portions of plants, and the devices 50 disposed and protected as stated serving efficiently to discharge liquid from below against plants, shrubs or trees. In this connection it will be noted that the inner devices 50 will afford an underspray for plants or shrubs in a row along and over which the apparatus is movable, and that the outer spray devices 50 form undersprays for plants or shrubs in rows at opposite sides of the line of traverse of the apparatus.

In addition to maintaining the contents of the tank 11 in an agitated state, the head or device 15 best shown in Figure 3 serves to effectively prevent the collection of sediment at the bottom of the tank.

It will be appreciated that the operation of the air compressors 4 will not contribute materially to the cost of operation of the apparatus as a whole when it is stated that the said air compressors are driven from the crank disks 2 and require practically no attention when the apparatus is in use.

While my novel apparatus is preferably formed of steel or other metal appropriate to its purpose, it manifestly is within the purview of my invention to construct the different parts of the apparatus of the material or materials that best lend themselves to the functions of the different parts.

While I prefer to employ the construction shown and described in all of its details, I do not desire to be understood as confining myself to the specific construction of the different parts and the relative arrangement of said parts, my invention being defined by my appended claim within the scope of which structural changes and changes of arrangement may be made without departure from my invention.

Having described my invention, What I claim and desire to secure by Letters-Patent, is:—

In a spray apparatus and in combination, a vehicle, trailing beams connected to the vehicle and swingable vertically and each having rearwardly divergent portions, shoes and fenders carried in pairs by said beams on said divergent portions thereof, one pair of shoes and fenders to each beam, and the said pairs of shoes and fenders spaced apart, spray devices carried by said shoes and fenders and disposed at the outer sides of the outer fenders and at the inner sides of the inner fenders, pipes carried by and extending between the fenders and interposed between the outer and inner spray devices thereof, one of said pipes to each beam, an upper central downwardly directed spray device, an upright valved conduit adapted to be connected with a source of spray supply on the vehicle and carrying said central spray device, lateral spray devices connected with said conduit and arranged to spray the upper portions of plants in rows, between which the apparatus is adapted to traverse, and an arched conduit connected at its apex to said upright conduit above the valve thereof and connected at its ends to the pipes carried by the fenders.

In testimony whereof I affix my signature.

GEORGE THOMAS COX.